Oct. 6, 1959 W. K. GANNETT 2,907,387
VERNIER TIMING MECHANISM
Filed April 21, 1954 3 Sheets-Sheet 1
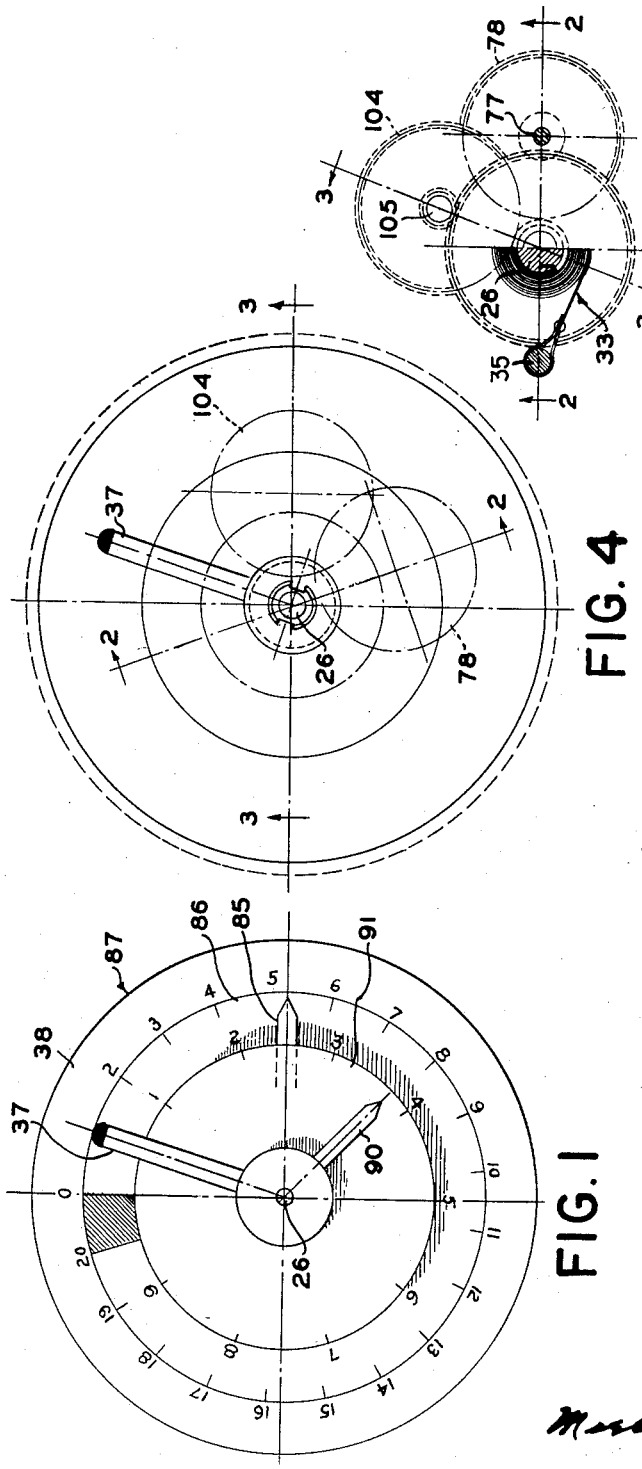
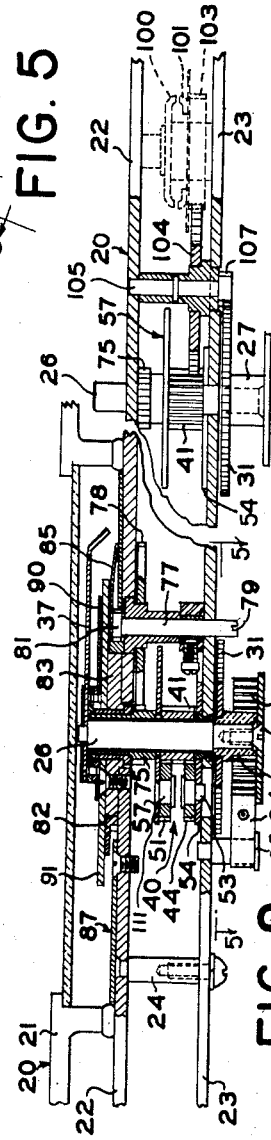
INVENTOR.
WRIGHT K. GANNETT
BY
Merrill M. Blackburn
ATTORNEY Oct. 6, 1959

W. K. GANNETT 2,907,387

VERNIER TIMING MECHANISM

Filed April 21, 1954

*INVENTOR.*
WRIGHT K. GANNETT

BY

*Merrill M. Blackburn*

ATTORNEY

Oct. 6, 1959
W. K. GANNETT
2,907,387
VERNIER TIMING MECHANISM
Filed April 21, 1954
3 Sheets-Sheet 3
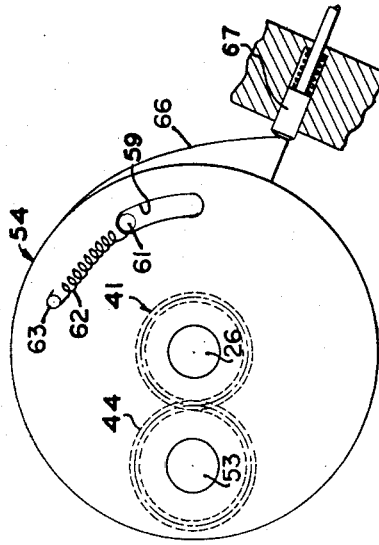
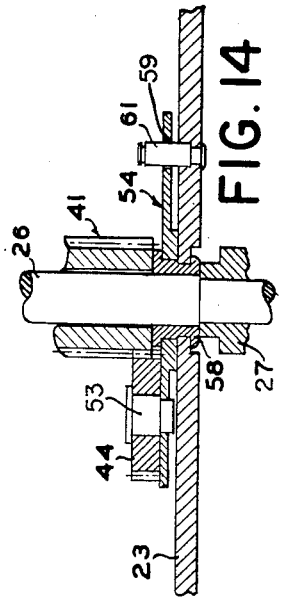
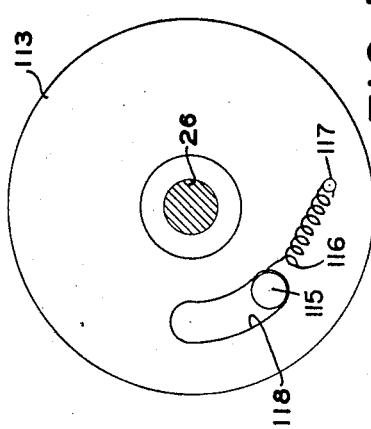
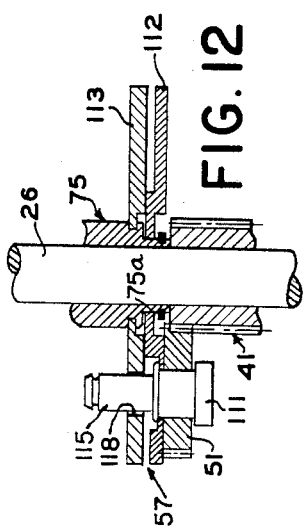
INVENTOR.
WRIGHT K. GANNETT
BY
Morrill M. Blackburn
ATTORNEY 2,907,387

VERNIER TIMING MECHANISM

Wright K. Gannett, Davenport, Iowa, assignor to Mast Development Company, Inc., Davenport, Iowa, a corporation of Iowa Application April 21, 1954, Serial No. 424,609

9 Claims. (Cl. 161—1)

The present invention relates to timing mechanism and is particularly concerned with a mechanism which may be used in time-interval indicating devices, as fuses for bombs or other ordnance of this character.

Among the objects of this invention are the provision of a simple and compact timer capable of measuring and indicating for a relatively long interval of time; the provision for both coarse and fine indicators; the provision of means for indicating the time interval for which the device is adjusted; the provision of means for indicating the elapsed time at any point during the interval being timed, which means preferably takes the form of an indicator which is connected to move during timing; the provision of a simple compact timer which utilizes the hunting tooth principle, such as, for example, in a stop motion gearing and, more specifically, in a planetary gearing arrangement. By virtue of the utilization of the hunting tooth principle, there may be provided a great number of revolutions of certain parts of the gearing between the beginning of timing and the end of timing.

These and other objects of the present invention will be apparent to those skilled in the art after consideration of the following detailed description of the preferred structure in which the principles of this invention are incorporated.

Figure 1 is a face view of a structure illustrating the principles of this invention.

Figure 2 is an approximately central section through this structure on the line 2—2 in Figures 4 and 5.

Figure 3 is a section on the line 3—3 in Figures 4 and 5.

Figure 4 is a somewhat diagrammatic view showing the relative position of the parts.

Figure 5 is a fragmentary view, as seen along the line 5—5 of Figure 2, showing the actuating spring.

Figure 12 is an enlarged fragmentary sectional view of one of the planet gear carriers, with associated resiliently connected shock resistant section.

Figure 13 is a view looking downwardly on the parts shown in Figure 12, certain parts being shown in section.

Figure 14 is a view similar to Figure 12, showing the other planet gear carrier and associated yielding device.

Figure 15 is a plan view, partly in section, of the parts shown in Figure 14 with means to be actuated at the end of the timing cycle.

Figure 16 is a modified form of actuated means, preferably in the form of an electrical contact mechanism.

Figure 9:
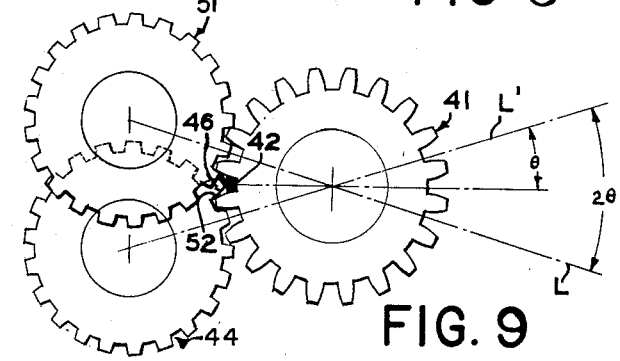
Figure 9 is similar to Figures 6 to 8, including two planetary gear trains with a common sun gear, each train employing the hunting tooth principle in its stop means.

The timer includes a frame 20 in the form of a support 21 carrying a relatively flat housing means made up of a front plate 22 and a rear plate 23, maintained in spaced-apart relation by spacers 24. A central shaft 26 is journaled in the plates 22 and 23 with the rear end extending outside of the plate 23 and fastened by a screw 28 to a hub 27 of a gear 31 for winding a spring 33, the outer end 34 of which is connected to an anchoring pin 35. An indicating hand 37 is fastened to the outer or forward end of the central shaft 26 to move over a dial to which detailed reference will be made hereinafter. Stop gearing 40, as shown in Figures 2 and 9, is mounted on the central shaft 26 and is of the planetary type.

Figure 10:
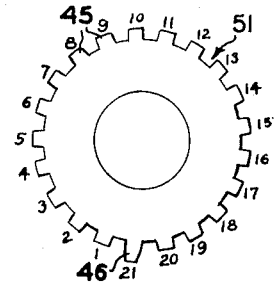
Figure 10 shows a planet gear per se.
Figure 11:
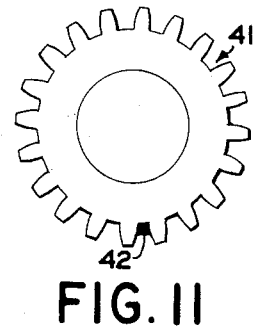
Figure 11 is a view of the associated sun gear per se.

This gearing 40 comprises two sets of planetary gear trains, having a common sun gear 41, journaled on the shaft 26, and associated motion-limiting means. Figure 11 shows the sun gear 41 having conventional gear tooth construction, except that one space between two adjacent teeth is partly filled in at 42 to form an abutment or stop. A planet gear 51 (Figure 10) is also of special construction in that all of the teeth 45 thereof are cut off, or so formed as to terminate at the pitch line of the teeth except that one tooth 46 is of full length and constitutes the hunting tooth.

Figure 6:
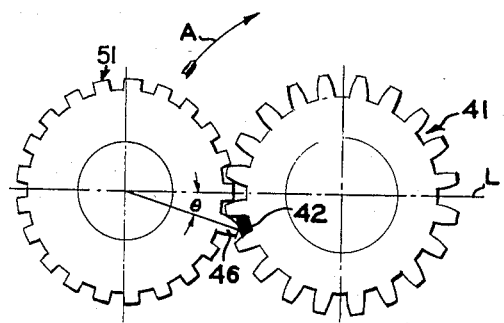
Figure 6 is a view showing a pair of gears provided with means for stopping relative rotation thereof in one direction.

Figure 6 shows the sun gear 41 and the planet gear 51 in operative meshing relation. The abutment 42 on the sun gear 41 and the hunting or long tooth 46, which in effect is a second abutment or stop, are in engagement at a point below the line L of centers. Thus, the sun gear 41 cannot be rotated in a clockwise direction from the position of Figure 6, and, if the sun gear 41 is held against rotation, the planet gear 51 cannot be moved around the sun gear 41 in a counter-clockwise direction. However, the sun gear 41 may be rotated in a counter-clockwise direction to drive the planet gear 51, or the planet gear 51 may be rolled about the sun gear 41 in a clockwise direction, as indicated by the arrow A.

Figure 7:
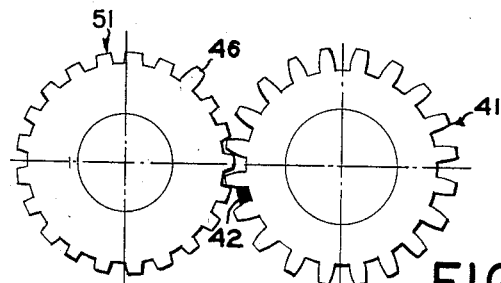
Figure 7 is a view of the gears of Figure 6 after the planet gear has been rotated through seventeen revolutions in the direction of the arrow A in Figure 6.
Figure 8:
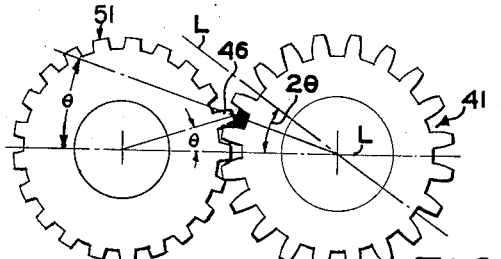
Figure 8 is a view of the gears of Figure 6 in their locked position which occurs after the planet gear of Figure 6 has been rotated through an angular displacement of 21 revolutions minus 2θ.

The extent of permissive rotation of the sun gear 41 and the planet gear 51, as shown in Figure 6, depends upon the number of teeth in each gear and the difference therebetween. For example, sun gear 41 has twenty teeth, and planet gear 51 has twenty-one teeth. Thus, when they are relatively rotated the hunting tooth 46 will progressively engage successive tooth spaces of the sun gear 41. Therefore the planet gear 51 may be rolled around the sun gear 41 for twenty complete revolutions plus an additional displacement, which falls short of a complete revolution by the angle 2θ, θ being the angle between the radial of the hunting tooth 46 and the line of centers L (Figure 6). This is therefore the limit of permissive planetary movement of the planet gear 51 about the sun gear 41 in a clockwise direction. Figure 8 shows the sun gear 41 at the end of its rotation in a clockwise direction except that in Figure 8 the gears are shown with the line of centers L displaced angularly compared with the position of the line L in Figure 6. Figure 7 illustrates an intermediate position, in which, for example, the planet gear 51 has been rotated through seventeen complete clockwise revolutions about the stationary sun gear 41 from the position of Figure 6. With the sun gear 41 and the planet gear 51 in the position shown in Figure 7, assuming that the line of centers L remains stationary, the sun gear 41 could be rotated clockwise through seventeen complete revolutions before the hunting tooth or long tooth abutment 46 would stop against the filled in space or abutment 42.

Figures 6 and 8 thus represent the two stop positions which are the farthest apart angularly, namely, over twenty complete revolutions or seventy-two hundred degrees plus an additional partial revolution. It is understood that, for example, the long tooth abutment 46 could be on the sun gear 41 and the abutment 42 could be on the planet gear 51, if desired, in which case the reduced tooth height would be on the sun gear 41. It will also be noted that, so far as the stop motion is concerned, the net effect is the same, whether the sun gear 41 is rotated and the line of centers L is held stationary, or the sun gear 41 is held stationary, and the planet gear 51 is run planetary fashion about the sun gear 41, rotating the line of centers L.

According to the principles of the present invention, the sun gear 41 and the planet gear 51 constitute a first planetary gear train cooperating with a second gear train made up of a second planet gear 44 and the sun gear 41, the sun gear 41 being of sufficient axial length to mesh with both planet gears, 51 and 44, when the planet gears are mounted in spaced-apart parallel planes. This arrangement is illustrated diagrammatically in Figure 9, in which the planet gear 44, having the same number and the same configuration of teeth as the planet gear 51, with one long tooth or abutment 52, is located below the planet gear 51. In the position shown in Figure 9, the long tooth abutment 46 engages the abutment 42 and prevents clockwise rotation of the sun gear 41, while the lower planet gear 44 is shown with its long tooth abutment 52 engaging the abutment 42, thus preventing rotation of the sun gear 41 in the counter-clockwise direction.

As shown in Figure 2, the planet gear 44 is rotatably mounted by a shaft 53 on a spider or gear carrier 54, and the planet gear 51 is mounted by a shaft 111 on a gear carrier 57; these carriers are journaled coaxially on the central shaft 26. In Figure 9, the lower gear carrier 54 is represented by the line of centers L' and the upper gear carrier 57 is represented by the line of centers L.

If the upper gear carrier 57 is turned clockwise about the axis of the sun gear 41, through a fraction of seventy-two hundred degrees and is held in that position, the sun gear 41 can then be turned clockwise away from its stop 52—42 with the planet gear 44 through the same fraction of seventy-two hundred degrees and the sun gear 41 may also then be turned back through the same angular displacement counter-clockwise into a stop position with the lower planet gear 44. Thus, the limit of the two positions, or the extent of permissive movement of the sun gear 41 in either direction, will be defined by the two planet gears 44 and 51, and the amount of permissive rotation of the sun gear 41 will be equal to the rotation previously set by the upper planet gear 51 and carrier 57, measured away from the terminal or zero position, as shown in Figure 9.

The lower gear carrier 54 is normally stationary relative to the frame 20, except that at the end of timing, when the sun gear 41 reaches the end of its permissive movement in a counter-clockwise direction, the gear carrier 54 is permitted to move a limited distance relative to the support. The means providing for this action is best shown in Figures 14 and 15. From these figures it will be seen that the gear carrier 54 is in the form of a disk journaled in the rear plate 23 by a bearing 58 through which the shaft 26 extends. The disk or carrier is slotted at 59 to receive a pin 61, that rises from the rear plate 23. The pin 61 anchors one end of a cushioning spring 62, the other end of which is fastened to a stud 63 carried by the disk. The spring 62 normally holds the disk in the position of Figure 15, but at the end of the counter-clockwise rotation of the sun gear 41, at the end of the timing period or cycle, when the stops 42—52 engage, the momentum of the associated parts causes an additional angular displacement of the disk against the tension of the spring 62. This movement of the disk may be used, as through an integral cam 66, to release a spring biased plunger 67 (Figure 15), or it may act to close a pair of contacts 71 and 72 (Figure 16). The spring-biased plunger 67 and/or the contacts 71 and 72 may be connected to actuate any suitable mechanism, such as a detonating means, in case the timer is incorporated in a bomb fuse. Likewise, the spring-biased plunger 67 or the contacts 71 and 72, as shown in Figure 16, may be connected to any kind of device or means to be timed.

The gear carrier or spider 57 is affixed to a gear 75 which is journaled on the shaft 26 and therefore rotatable relative to the sun gear 41. A setting shaft 77, to which is keyed a gear 78, is journaled in the supporting frame 20 and meshes with the gear 75. The lower end of the shaft 77 has a slot 79 to receive a screw driver or other tool whereby the shaft 77 may be rotated, or the shaft may have a suitable knob or hand wheel. In the construction illustrated, the gear 75, like the sun gear 41, has twenty teeth, and the setting gear 78 has sixty teeth. Thus, six and two-thirds revolutions of the setting shaft 77 will turn the upper gear carrier 57, with planet gear 51, through twenty revolutions, which introduces into the device substantially the maximum permissive angular separation of the planet gear carriers 54 and 57.

The extent of the setting movement is indicated by a pair of intergeared hands or pointers 85 and 90, producing respectively a coarse indication on a coarse dial 86 and a fine or vernier indication on a vernier dial 91. For this purpose, the upper or forward end of the setting shaft 77, as shown in Figure 2, carries a small pinion 81 which meshes with a large ring gear 82 rotatable on a stationary disk 83 and carrying the indicating hand or pointer 85. The pinion 81 has ten teeth and the ring gear 82 has seventy teeth. The hand 85, or coarse pointer, moves over the coarse portion 86 of the dial 87 which is graduated into spaces, numbered as shown in Figure 1, from 1 to 20. The shaft 77 carries the sixty-tooth gear 78 which meshes with the twenty-tooth pinion 75 that is keyed to the upper planet carrier 57.

In the construction described, and starting from the position of the planetary stop gearing in the position shown in Figure 9, the desired time interval to be measured is set into the device by turning the setting shaft 77 to advance the upper gear carrier 57 the desired proportion of seventy-two hundred degrees of rotation (twenty revolutions), it being preferable to disregard the possible additional movement of three hundred and sixty degrees minus $2\theta$ available in the twenty-first revolution. If desired or necessary, stop means of any suitable character may be provided for the gears 81 and 82 to positively limit the setting movement to exactly twenty revolutions of the gear carrier 57 to which the vernier hand 90 is connected. For example, there can be a portion of the gear 82 where no teeth are cut, to interfere with the gear 81 and prevent setting beyond the desired twenty turns of the gear carrier 57, which is indicated by the vernier hand 90.

After the desired time interval has been set in the timer, it is necessary to provide means for rotating the sun gear 41 between the stop limits established by the setting means. According to the present invention, the sun gear 41 is driven in one direction, as toward the end of the timing cycle, by a chronometric gear train, the driving being, in effect, from the upper planetary stop to the lower planetary stop to produce the end of timing actuation desired, such as the plunger or contact actuation, as shown in Figures 15 and 16, mentioned above.

Figure 3 illustrates one form of a chronometric gear train, which includes an electric synchronous motor, not shown, connected through a clutch 100 and 101 to drive a gear 103. The gear 103 drives a large idler gear 104 which is mounted on a shaft 105 and connected, either through the shaft 105, or otherwise, to a pinion 107. The idler gear 104 meshes directly with the sun gear 41. The pinion 107, below or rearwardly of the frame plate 23, meshes with the large gear 31 which, as described above, is affixed through the hub 27 of the spring 33 to the central shaft 26. The ratio between the gears 31 and the pinion 107 is 7 to 1. The parts are so arranged that the clutch 100 drives the sun gear 41 counterclockwise to "end of timing."

The spring 33 constitutes the principal part of the resetting means, as shown in Figures 2 and 5. When the clutch 101 drives the sun gear 41 toward the end of timing, the spring 33 is tightened or wound up so that, when the end of timing occurs, the spring 33 drives the sun gear 41, and associated parts, back to the start of the timing position merely by releasing the clutch 101. This can be done manually, by an electric magnet controlled from a manual button, or by an electric magnet actuated by other means, such as the electric contacts 71 and 72, as shown in Figure 16. For example, the clutch 101 can be actuated by a change in the internal circuit of the timer, produced by any suitable means. The clutch can be controlled by a magnet energized during timing and deenergized for reset, or vice versa.

After the end of timing has been reached and the clutch 101 disconnected, the spring 33 spins the gearing backward (clockwise) through the angle set into the device by the setting means 77, and associated parts, until the sun gear 41 returns to or comes up against the upper planetary stop 46—42 which terminates further rotation. In order to eliminate shock at this point in the operation, any kind of speed-damping means may be employed, but in order to secure the advantages of a fast reset, it is preferred to equip the upper planetary with cushioning or shock absorbing means, such as that illustrated in Figures 12 and 13. In this form of the invention, the upper planet gear carrier 57 is made of two parts, namely a primary plate 113 and a secondary plate 112, the latter being rotatable through a limited extent relative to the former which is affixed to a sleeve 75a of the pinion 75 of the setting mechanism. To provide for cushioned relative movement between the primary and secondary carriers, the pivot 111 is solid in the plate 112 and is extended at 115 to form a stud which projects through a slot 118 in the plate 113. A spring 116 is connected at one end to the stud and at its other end to a stud 117 on the plate 113. Thus, when the spring 33 turns the sun gear 41 during the resetting operation and the sun gear reaches the stop position, the planet gear 51 and the plate 112 may move angularly against the action of the spring 116, as far as the slot 118 permits, while the plate 113, being affixed to the sleeve 75a of the gear 75, is fixed by the setting mechanism. This is sufficient to cushion the shock at the end of the resetting cycle. If the speed of reset is slowed by some means, thus minimizing shock, the shock absorber mechanism, just described becomes unnecessary.

When both planetaries 41, 44 and 41, 51 are in the position of Figure 9, they are not entirely at zero setting. The reason for this is that to the rotational setting of the upper planetary must be added a small additional fixed angle offset on the dial, equal to the end of timing movement of the lower planetary gear carrier 54. This end of timing movement is a part of the total timing rotation.

Operation

During the manual setting operation, shaft 77 is turned and this creates two phases of rotation in the timer. The first is a coarse or slow indication on pointer 85, driven through ten-tooth pinion 81 on shaft 77 and seventy-tooth gear 82 on pointer 85, and turning in a clockwise direction (as seen on the plan view) for an increasing setting, but capable of moving in either direction between its lower stop at "0" on the dial and its upper stop at "20." The second rotation is the fast or vernier rotation feeding from sixty-tooth gear 78 on shaft 77 to twenty-tooth gear 75 on spider 57 at the hunting-tooth planetary mechanism 40. This same rotation also feeds through the sleeve on 75 into vernier pointer 90, to which said sleeve is keyed, and turns this pointer in a clockwise direction for an increasing setting. It may turn as many as twenty revolutions or any fraction thereof—one revolution for each increment of motion on the coarse dial 87—being limited only by the stops on the motion of coarse pointer 85.

Thus, spider 57 is turned clockwise and seeks a position within twenty revolutions or 7,200° of arc to define an angle through which sun gear 41 must be driven synchronously to complete the timing cycle. Planetary 51 carried by spider 57 defines this "stop within many revolutions" by hunting-tooth action—to be described later.

Suppose the timer is in the "reset" part of the cycle as distinguished from "timing" or "timed out." This means the driving clutch 100—101 is open and no longer restrains the gear train between 101 and sun gear 41 shown in Figure 3, nor does it restrain gears 107 and 31 to the coiled, clock-spring type of return spring 33. Thus, return spring 33 takes precedence and tries to unwind, thereby turning gear 31 clockwise (plan view, Figure 5) and sun gear 41 also clockwise.

The ratio of gears 107 to 31 is selected to wind spring 33 through a limited angle—in this case ten teeth to seventy teeth for $20/21$ of a turn.

Thus, it can be seen that as spider 57 is manually turned clockwise in an increasing-count direction, sun gear 41—provided the timer is in the reset part of the cycle—follows spider 57 as if rigid with it, holding the hunting-tooth stop between 41 and planetary 51 closed or engaged. If the manual setting is turned oppositely in a decreasing direction, sun gear 41 is forced "backward" thereby winding up spring 33 tighter.

Thus, the changes in position of spider 57 relative to planetary 40 define variable starting points for the subsequent timed rotation of sun gear 41. This is just the reverse of the usual procedure of having a fixed starting point and a variable ending point. Planet gear 44 on spider 54 defines the "fixed" stopping point. Actually spider 54 is held by spring 62 against the preload stop 59—61. As sun gear 41 is driven synchronously toward the end of its timing cycle (counter-clockwise) the hunting-tooth stop 42—52 between these gears 41 and 44 engages, locking 44, 54, and 41 together as a unit so that all rotate together subsequently through a small angle sufficient to actuate the "timed-out" switch (66—67 or 66—71—72).

Returning to Figure 16, the timed-out switch actuation may open the clutch 100—101—with or without shutting off the drive motor—thereby providing reset immediately after the timing cycle. Alternatively the switch can be wired to stop the motor—assuming an electric synchronous motor—and leave the clutch closed. This holds the timer in the "timed out" condition. Different kinds of external control circuits can be handled in this way—i.e. different from having reset immediately following timing. Reset is then done immediately before the next timing cycle, being initiated by the same external, presumably manual, switch that initiates the cycle. The time required for reset enters as a timing error into the new cycle.

The switch actuated as above could be of any type having any combination of front and back contacts for control of external load circuits—via relay if necessary—and internal circuitry as well.

This switching is of special importance for industrial applications, to which this mechanism is particularly well adapted as well as for fuse versions; although, the two have basic points of difference not material here.

When the clutch opens after timing out, sun gear 41 spins rapidly clockwise, accelerating under the action of return-spring 33, ultimately running into the hunting-tooth stop 42—46 with planetary 51, and the impact is absorbed by the preloaded spring-and-stop arrangement (Figure 13) relative to 75 to serve as a shock absorber. The shock causes spring-resisted over-travel with subsequent return to the accurate preload-stop position.

Since the gear ratio of 107 to 31 is the same as 81 to 82 (one to seven), shaft 26 which is turned by gear 31 and spring 33 turns with the correct speed to be read against dial 87 by "time-remaining" pointer or hand 37. In the reset position, hand 37 is turned to its greatest clockwise position, overlying hand 85 and indicating the full time setting as the time remaining. Assembly is done so as to provide this synchronism of hands 37 and 85. When timing commences hand 37 drives back toward zero counter-clockwise while the motor drive winds up spring 33.

There is no time-remaining vernier hand. Hand 37 reaches zero at the instant of timed-out switch actuation. Hand 37 moves rapidly clockwise from zero to the time setting of hand 85 during reset, overtravelling hand 85 very slightly due to the shock-absorber action (Figures 12 and 13).

The motions of the planetary or hunting-tooth mechanism are shown in Figures 6 through 11. The hunting-tooth provides a stop within many revolutions between two gears.

Figures 6, 7, 8 and 9 are plan views showing sun gear 41 to the right. Its center is fixed to the timer frame 20. Spider 57 carries the center of planetary 51. Direction A is the planetary direction for increased time setting, Figure 6. Figure 6 shows hunting-teeth 46 and 42 locked. This locked position is assumed by these gears after reset and is maintained during time setting in either direction provided sun gear 41 has reset, because return spring 33 holds 41 against this stop regardless of the planetary motion of 51. Figure 6, being after reset, is also the configuration at the start of timing.

During timing, as in Figure 7, sun gear 41 rotates counter-clockwise with tooth 46 being displaced one tooth after each revolution. If sun gear 41 were to travel 21 turns minus 2θ it would run into the "back side" of stops 46 and 42 per Figure 8. To avoid this contingency, rotation is preferably limited to 20 turns, which falls short by 360° minus 2θ of hitting the back side of the stop. Consequently Figure 8 does not illustrate a condition actually encountered, but is shown for purposes of explanation only.

In Figure 9, suppose 57 and 51 are turned clockwise to set in a time greater than the minimum. If gear 41 is in the reset condition it will follow 51 and 57 as if rigid therewith, thereby turning away from its stop with 44 at 52 and 42 by as much as 20 turns, less the timed-out switch-actuation angle (SAA) which would be the full dial setting. Subsequently, during timing, 41 turns counterclockwise by the dial setting angle minus SAA at which stops 42 and 52 reengage and 41, 52, 44 and 54 are carried counter-clockwise together integrally as if all were secured together through angle SAA to actuate the timed-out switch.

When the clutch is opened, 41 then resets through as much as 7200° clockwise until it reengages stop 46 on planetary 51. At the same time, gear 44 returns clockwise to its preload stop (Figures 12, 13).

It is of course understood that the specific description of structure set forth above may be departed from without departing from the spirit of this invention as disclosed in this specification and as defined by the appended claims.

Having now described by invention, I claim:

1. In a timing mechanism: a support; a sun gear journaled on the support; a carrier swingable about the sun gear; a first planet gear meshing with the sun gear and journaled on the carrier; first stop means including cooperative elements respectively on the gears and one-way engageable to prevent rotation of the sun gear in one direction when the carrier is held but enabling turning of the carrier in said one direction; a second planet gear in mesh with the sun gear; means journaling the second planet gear on the support and operative to hold the planetary position of said second planet gear while enabling rotation thereof; second stop means including cooperative elements respectively on the sun gear and second planet gear and one-way engageable oppositely to the first stop means to prevent rotation of the sun gear in the opposite direction; both stop means being engaged in an initial position of the gears whereby the sun gear is temporarily fixed; means for turning the carrier in said one direction about the sun gear axis through a selected angle to a selected position and causing the first planet gear to tend to roll around the sun gear so as to incur angular separation of said first stop means elements in a selected amount while the second stop means remains engaged; and means operative to subsequently rotate the sun gear in said one direction in said selected amount until said first stop means elements re-engage, said second stop means elements becoming thereby angularly separated.

2. The invention defined in claim 1, in which: the sun gear is relatively axially elongated and the first planet gear and carrier are axially offset from the second planet gear so that said carrier may be turned more than one revolution about the sun gear.

3. The invention defined in claim 1, including: means operative while the carrier is held in said selected position and said second stop means elements are angularly separated for reversing the sun gear until said second stop means elements re-engage, and said first stop means elements thereby becoming again angularly separated according to said selected position of the carrier.

4. The invention defined in claim 3, in which: said means for reversing the sun gear includes a drive device causing relatively abrupt reengagement of said second stop means elements; and the means mounting the second planet gear includes yielding means enabling limited shifting of said second planet gear upon re-engagement of said second stop means elements.

5. The invention defined in claim 3, including: spring means operative to turn the sun gear in the direction of re-engagement of said first stop means elements at said set position of the sun gear, said spring means being thereby loaded when the sun gear is reversed; and means operative upon re-engagement of the second stop means elements upon reversal of the sun gear for releasing the spring means for automatically turning the sun gear to said set position after each reversal of the sun gear.

6. The invention defined in claim 5, including: yielding means mounting the first planet gear on the carrier to enable limited relative angular movement between the first planet gear and carrier as said first stop means elements re-engage under the impetus of said spring means.

7. The invention defined in claim 4, including: control means operative in response to shifting of said second planet gear upon re-engagement of said second stop means elements.

8. The invention defined in claim 1, in which: the means for turning the carrier includes a gear coaxially secured to the carrier and further gearing offset from and in mesh with said carrier gear, and said carrier has an indicator thereon indicating the angle through which it is turned.

9. The invention defined in claim 8, including: a second indicator journaled coaxially with the carrier and driven by said gearing at a ratio different from the ratio between the carrier gear and said gearing to augment the indication of the angle through which the carrier is turned.

(References on following page)

References Cited in the file of this patent

UNITED STATES PATENTS

| | | | |
|---|---|---|---|
| 1,203,840 | Bailey | Nov. | 7, 1916 |
| 2,163,419 | Warren | June 20, 1939 |
| 2,223,207 | Ellis | Nov. 26, 1940 |
| 2,293,299 | Mastney et al. | Aug. 18, 1942 |
| 2,360,321 | Griswold | Oct. 17, 1944 |
| 2,423,588 | Elliott | July 8, 1947 |
| 2,496,457 | Elliott | Feb. 7, 1950 |
| 2,568,122 | Gallagher et al. | Sept. 18, 1951 |
| 2,599,934 | Opocensky | June 10, 1952 |
| 2,721,441 | Boyles | Oct. 25, 1955 |

FOREIGN PATENTS

| | | |
|---|---|---|
| 243,510 | Switzerland | July 15, 1946 |